(12) United States Patent
Sato et al.

(10) Patent No.: US 7,033,704 B2
(45) Date of Patent: Apr. 25, 2006

(54) ALKALINE STORAGE BATTERY HAVING A SEPARATOR WITH PORES

(75) Inventors: Naoto Sato, Kosai (JP); Nobuyasu Norishita, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 379 days.

(21) Appl. No.: 10/300,087

(22) Filed: Nov. 20, 2002

(65) Prior Publication Data

US 2003/0124428 A1    Jul. 3, 2003

(30) Foreign Application Priority Data

Nov. 20, 2001    (JP) .............................. 2001-355270

(51) Int. Cl.
*H01M 2/16* (2006.01)

(52) U.S. Cl. ..................... 429/247; 429/250; 429/254

(58) Field of Classification Search ............... 429/133, 429/145, 247, 250, 254
See application file for complete search history.

(56) References Cited

U.S. PATENT DOCUMENTS

| | | | | |
|---|---|---|---|---|
| 5,609,976 A | * | 3/1997 | Ueda et al. .................. | 429/254 |
| 5,830,603 A | * | 11/1998 | Oka et al. .................... | 429/249 |
| 6,261,721 B1 | * | 7/2001 | Andrieu et al. ............. | 429/249 |
| 6,743,551 B1 | * | 6/2004 | Imasato et al. ............. | 429/250 |

FOREIGN PATENT DOCUMENTS

| | | | | |
|---|---|---|---|---|
| JP | 2000021382 A | * | 1/2000 | |
| JP | 2000123816 A | * | 4/2000 | |

* cited by examiner

*Primary Examiner*—Gregg Cantelmo
(74) *Attorney, Agent, or Firm*—Snell & Wilmer L.L.P.

(57) ABSTRACT

An alkaline storage battery comprises: a positive electrode plate; a negative electrode plate; a separator; and an alkaline electrolyte retained by the positive electrode plate, the negative electrode plate, and the separator, wherein the separator has a large number of pores, such that a total volume A of the pores (per unit mass; $cm^3/g$) is in the range of $1 \leq A \leq 5$, and the ratio of the volume B of pores having a diameter of 100 μm or more (per unit mass; $cm^3/g$) to the total pore volume A is in the range of $7\% \leq B/A \leq 20\%$ (i.e., B/A is between 0.07 and 0.2).

4 Claims, 5 Drawing Sheets

ALKALINE STORAGE BATTERY HAVING A SEPARATOR WITH PORES

BACKGROUND OF THE INVENTION

1. Field of the Invention

The present invention relates to a separator for an alkaline storage battery and to an alkaline storage battery using the separator.

2. Description of the Related Art

In recent years, alkaline storage batteries have been used as a power source of various devices, such as a cellular phone, a notebook computer, an electric vehicle, a hybrid vehicle, etc. An increase in characteristics, especially an increase in lifetime, of such alkaline storage batteries has been highly demanded. An alkaline storage battery includes a positive electrode plate, a negative electrode plate, a separator, and alkaline electrolyte retained by the positive electrode plate, the negative electrode plate, and the separator. In order to increase the lifetime of the battery, it is necessary to increase the liquid retaining ability of the separator such that a larger amount of the alkaline electrolyte is retained by the separator. In order to increase the liquid retaining ability of the separator, it is necessary to increase the surface area of the separator.

A typical separator used in an alkaline storage battery is porous, i.e., it has a large number of pores. The liquid retaining ability of such a separator varies according to the diameter of the pores. Electrolyte does not readily pass through a pore having a small diameter, and hence is steadily retained in such a small diameter pore; whereas electrolyte readily passes through a pore having a large diameter, and hence is not steadily retained in such a large diameter pore. Thus, since a separator of a storage battery has various pore sizes, the distribution of electrolyte inside the battery is non-uniform.

In a separator of an alkaline storage battery, for the purpose of increasing the ability for retaining electrolyte, the density (weight per unit area) of the separator is increased, or the separator is made of a finer fiber such that each pore of the separator has a small diameter. However, in the case where the diameter of a pore is reduced, the air permeability of the separator is decreased, and accordingly, the internal pressure of the battery is increased. For example, although in normal operation, gas which is generated from a positive electrode plate when the battery is overcharged is transmitted through the separator and consumed by a negative electrode plate, this reaction is suppressed when the air permeability of the separator is low, and accordingly, the internal pressure of the battery is increased. If the internal pressure of the battery exceeds the threshold pressure of a safety valve, gas inside the battery, or the like, is expelled from the battery. As a result, the lifetime of the battery may be shortened.

SUMMARY OF THE INVENTION

According to one aspect of the present invention, an alkaline storage battery includes: a positive electrode plate; a negative electrode plate; a separator; and an alkaline electrolyte retained by the positive electrode plate, the negative electrode plate, and the separator, wherein the separator has a large number of pores, such that a total volume A of the pores (per unit mass; $cm^3/g$) is in the range of $1 \leq A \leq 5$, and the ratio of the volume B of pores having a diameter of 100 μm or more (per unit mass; $cm^3/g$) to the total pore volume A is in the range of $7\% \leq B/A \leq 20\%$ (i.e., B/A is between 0.07 and 0.2).

By appropriately setting the volume of pores of a separator, a sufficient amount of electrolyte can be retained by the separator, and the permeability of the separator for gas generated in the battery can be increased.

In one embodiment of the present invention, the average pore diameter C (μm) of the separator is in the range of $10 \leq C \leq 30$.

In another embodiment of the present invention, the separator is made of a hydrophilized polyolefin resin.

In still another embodiment of the present invention, the ratio of the amount D of electrolyte retained by the separator (per unit mass; $cm^3/g$) to the total pore volume A of the separator satisfies the relationship of $0.8 \leq D/A < 1$.

Thus, the invention described herein makes possible the advantages of providing an alkaline storage battery which uses a novel separator having both high liquid retaining ability and high air permeability.

These and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to the drawings.

Figure 1:
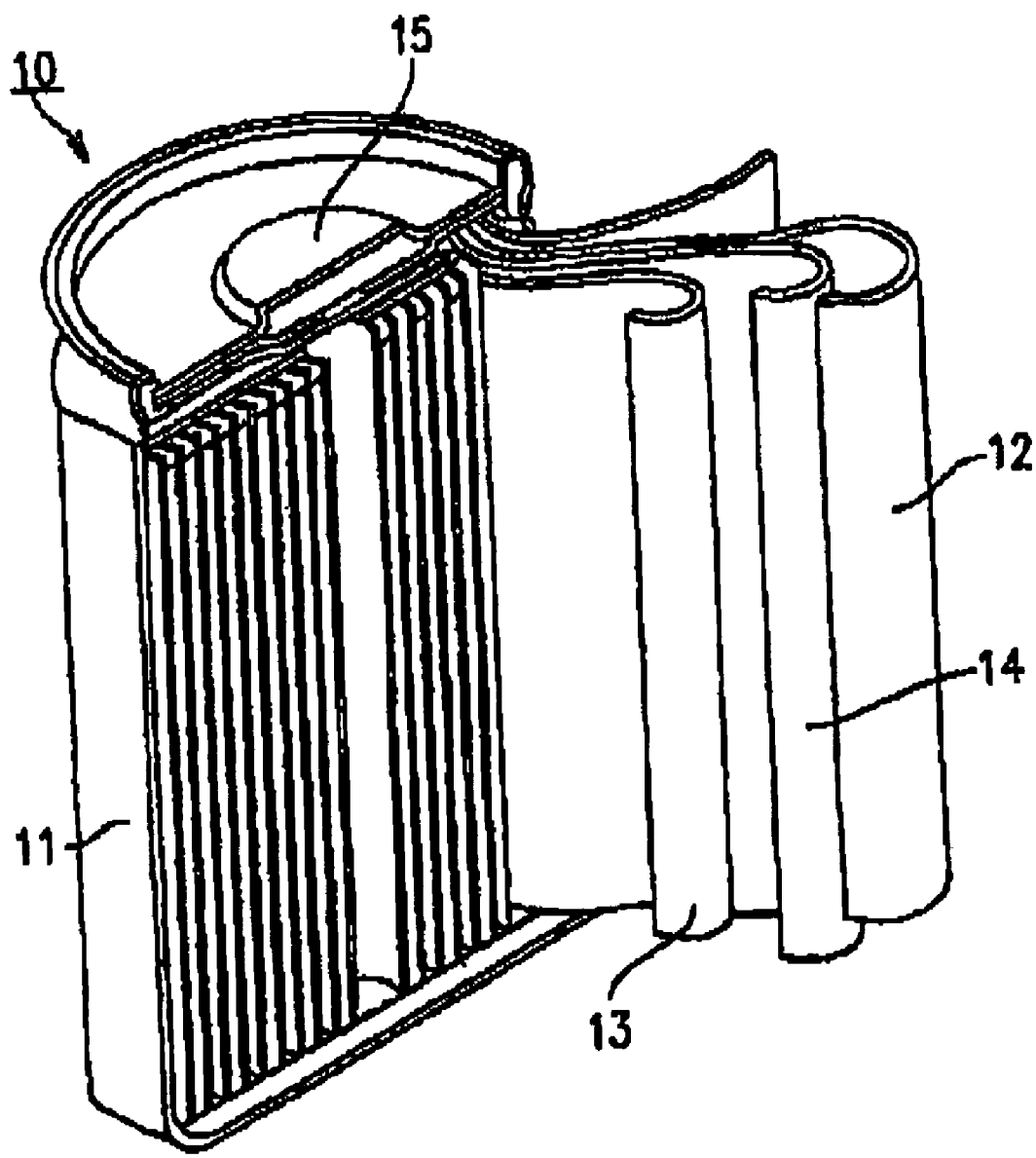
FIG. 1 is a perspective view of an alkaline storage battery 10, which illustrates the inside structure thereof.

An example of an alkaline storage battery according to the present invention is shown in FIG. 1. FIG. 1 is a perspective view of an alkaline storage battery 10, which illustrates the inside structure thereof. The alkaline storage battery 10 includes a case 11, positive electrode plates 12, negative electrode plates 13, and separators 14 provided between the positive electrode plates 12 and the negative electrode plates 13. The positive electrode plates 12, the negative electrode plates 13, and the separators 14 are accommodated in the case 11. The alkaline storage battery 10 further includes electrolyte (not shown), and a sealing plate 15 having a safety valve (not shown). The electrolyte is retained by the positive electrode plates 12, the negative electrode plates 13, and the separators 14.

The separator 14 is porous, i.e., it has a large number of pores. The separator 14 mixedly has various sizes of pores, i.e., it mixedly has pores having different diameters. The liquid retaining ability of the separator 14 varies according to the diameter of pores. Electrolyte does not readily pass through a pore having a small diameter, and hence is steadily retained in the small diameter pore, i.e., inside the separator 14; whereas electrolyte readily passes through a pore having a large diameter, and hence is not steadily retained in the large diameter pore, i.e., inside the separator 14.

Thus, since the separator 14 has various sizes of pores, the distribution of electrolyte retained by the separator 14 inside the battery 10 is non-uniform. This is because, as described above, a small diameter pore has a high ability for retaining electrolyte, whereas a large diameter pore has a low ability for retaining electrolyte, so that the amount of electrolyte retained by the large diameter pore is smaller than that retained by the small diameter pore. Thus, the ratio between the number of small diameter pores and the number of large diameter pores is appropriately selected, whereby the amount of electrolyte retained by the separator 14 is appropriately maintained, and the permeability of the separator 14 for gas generated in the battery 10 can be increased.

A separator used in an alkaline storage battery of the present invention may be made of a polymer material having high alkali-resistance, for example, a polyolefin resin, such as polyethylene or polypropylene, but the present invention is not limited to these materials. When hydrophilization treatment is necessary, sulfonation treatment, graft polymerization, plasma treatment, corona discharge treatment, fluoridizing treatment, or the like, may be performed.

The total pore volume A of such a separator (per unit mass; $cm^3/g$) is in the range of $1 \leq A \leq 5$, and the ratio of the volume B of pores having a diameter of 100 μm or more (per unit mass; $cm^3/g$) to the total pore volume A is in the range of $7\% \leq B/A \leq 20\%$ (i.e., B/A is between 0.07 and 0.2), whereby both a sufficient liquid retaining ability and sufficient air permeability can be obtained in the battery.

A separator used in an alkaline battery cell of the present invention can be produced by a generally-employed method. Specifically, a separator produced using a wet process, a dry process, spun-bonding, a melt-blow method, or the like, is exposed to a fine and hard water shower having water drops with a diameter of 100 μm or more, whereby pores having a diameter of 100 μm or more can be formed in the separator. Further, the ratio between the number of small diameter pores and the number of large diameter pores can be readily changed by changing the time during which the separator is exposed to the water shower, the intensity of water flow, etc.

The other parts of the battery may be made of materials generally employed in an alkaline storage battery. In the case where the alkaline storage battery 10 is a nickel metal hydride storage battery, the positive electrode plate 12 may contain nickel hydroxide as an active material, and the negative electrode plate 13 may be mainly made of hydrogen-storing alloy. Further, the electrolyte may contain potassium hydroxide as a main solute.

In the case where the alkaline storage battery 10 is a nickel-cadmium storage battery, the negative electrode plate 13 is made of cadmium, which is a different material from that used in the nickel metal hydride storage battery.

In the alkaline storage battery 10 of the present invention, it is preferable that the ratio of the amount D of electrolyte retained by the separator 14 (per unit mass; $cm^3/g$) to the total pore volume A of the separator 14 (per unit mass; $cm^3/g$) satisfies the relationship of $0.8 \leq D/A < 1$. By setting the amount of electrolyte retained by the separator 14 so as to satisfy this relationship, an increase in the internal resistance of the battery can be suppressed. Herein, the total pore volume per unit mass A of the separator 14 is a volume per unit mass of a volume obtained by subtracting the volume of the resin in the separator 14 from the total volume of the separator 14. Herein, the volume of the separator 14 including those of the pores can be calculated from the measured surface area and thickness of the separator 14. The volume of the resin in the separator 14 can be calculated from the density of the resin in the separator 14 and the mass of the separator 14. For example, the expression, $D/A=1$, means that all of the pores of the separator 14 are filled with electrolyte.

It should be noted that the cylindrical alkaline storage battery shown in FIG. 1 is merely an example of the present invention. The alkaline storage battery of the present invention is not limited to the embodiment shown in FIG. 1. For example, the principle of the present invention is also applicable to an alkaline storage battery having any shape other than a prismatic shape or a cylindrical shape.

EXAMPLES

Hereinafter, the present invention is described in more detail with reference to specific examples.

Example 1

In Example 1, an exemplary nickel metal hydride storage battery of the present invention and a production method thereof are described.

In the first step, foam nickel was filled with a paste of an active material containing nickel hydroxide. The resultant foam nickel was dried, subjected to pressure, and cut so as to obtain a positive electrode plate having a desired shape. Similarly, a paste containing hydrogen-storing alloy was applied on an electrically-conductive support. The resultant material was dried, subjected to pressure, and cut so as to obtain a negative electrode plate having a desired shape. A separator used was a nonwoven fabric made of sulfonated polypropylene fiber having a constant fiber diameter (about 12 μm). Then, the positive and negative electrode plates with the separator inserted therebetween were rolled into a cylindrical shape. When rolling the electrode plates and separator, there is a possibility that a short-circuit occurs in the roll of the electrode plates and separator. Herein, the rate of occurrence of such a short-circuit is referred to as "short-circuit rate". The roll of electrode plates was placed in a case, and the case was filled with electrolyte. The case was then sealed with a sealing plate so as to obtain a nickel metal hydride storage battery having a characteristic (ampere-hour capacity) of 6.5 Ah. The electrolyte used was a electrolyte containing potassium hydroxide as a primary solute and having a specific gravity of 1.3. After assemblage of the battery was completed, the battery was charged to 120% with a current of 0.4 CA. The internal pressure of the thus-charged battery was measured, whereby the maximum internal pressure of the battery was evaluated.

In Example 1, the thickness of the separator was 180 μm, the average pore diameter was 20 μm, and the ratio of the volume of pores having a diameter of 100 μm or more to the total pore volume was 10%. According to these specifications 11 sample types having different densities (weight per unit area; 5 to 100 g/cm²) were produced. For each sample, the total pore volume (per unit mass; cm³/g), the porosity (the ratio of the total pore volume to the total volume of the separator (%)), the short-circuit rate in an electrode plate roll in which each sample was used (%), and the maximum internal pressure of a battery produced using each sample (kgf/cm²), were as shown in Table 1 below.

TABLE 1

Average pore diameter = 20 μm
Ratio of the volume of pores having a diameter of 100 μm or more = 10%

| Density (g/m²) | Porosity (%) | Total pore volume (cm³/g) | Short-circuit rate (%) | Maximum internal pressure (kgf/cm²) |
|---|---|---|---|---|
| 5 | 97% | 34.94 | 100 | |
| 10 | 94% | 16.94 | 57 | 5 |
| 20 | 88% | 7.94 | 5 | 6 |
| 30 | 82% | 4.94 | 0 | 6 |
| 40 | 76% | 3.44 | 0 | 7 |
| 50 | 70% | 2.54 | 0 | 6 |
| 60 | 65% | 1.94 | 0 | 7 |
| 70 | 59% | 1.51 | 0 | 6 |
| 80 | 53% | 1.19 | 0 | 7 |
| 90 | 47% | 0.94 | 0 | 15 |
| 100 | 41% | 0.74 | 0 | 15 |

Figure 2:
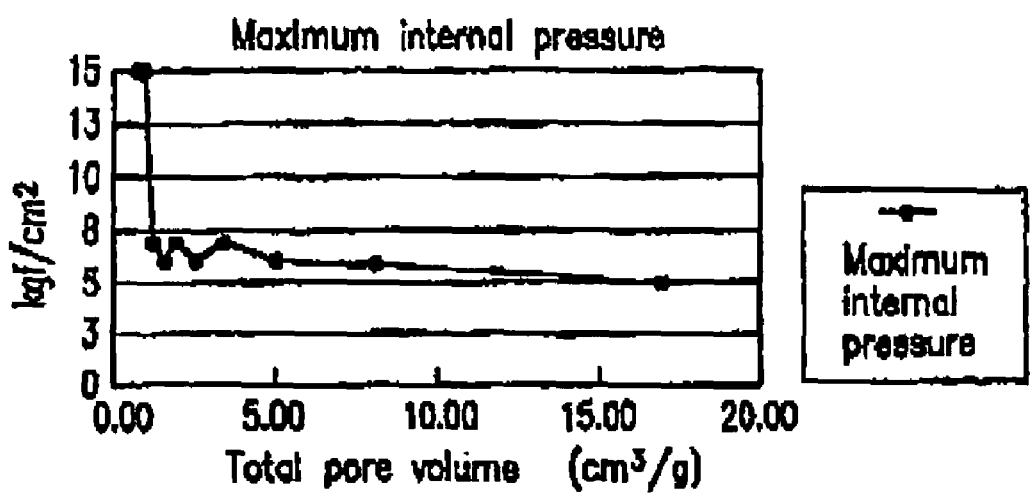
FIG. 2 is a graph illustrating the relationship between the total pore volume per unit mass of a separator and the maximum internal pressure in a battery of Example 1 of the present invention.
Figure 3:
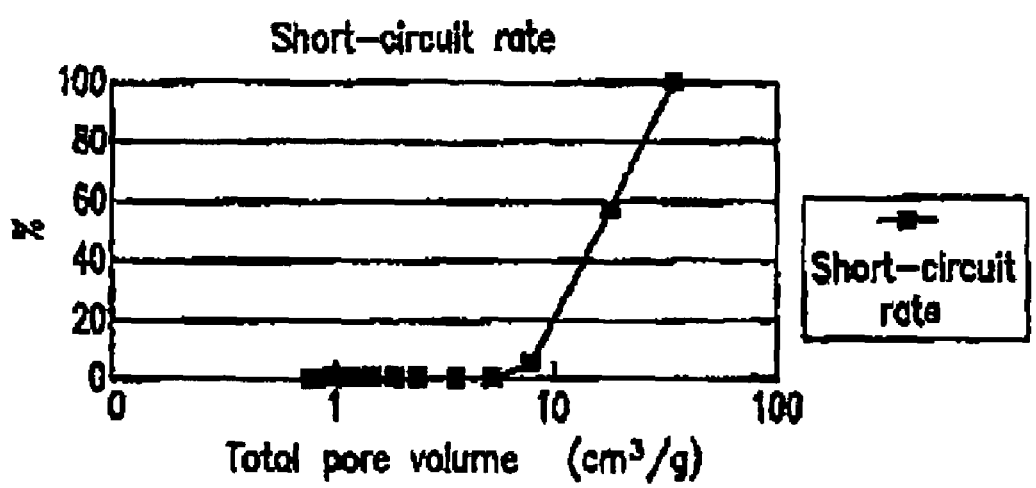
FIG. 3 is a graph illustrating the relationship between the total pore volume per unit mass of a separator and the short-circuit rate in an electrode plate roll in Example 1.
Figure 4:
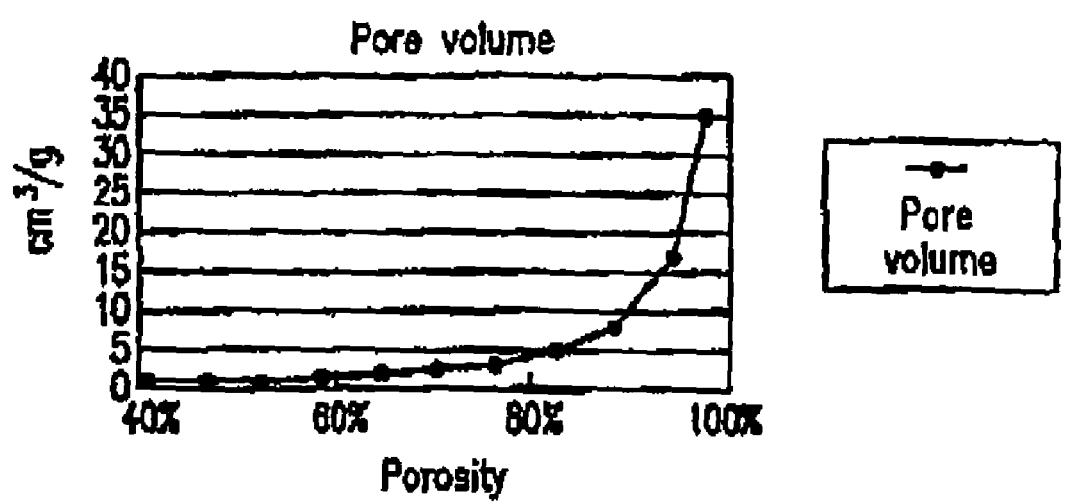
FIG. 4 is a graph illustrating the relationship between the porosity and the total pore volume per unit mass of a separator of Example 1.

FIG. 2 is a graph illustrating the relationship between the total pore volume per unit mass and the maximum internal pressure in the battery. FIG. 3 is a graph illustrating the relationship between the total pore volume per unit mass A and the short-circuit rate. FIG. 4 is a graph illustrating the relationship between the porosity and the total pore volume per unit mass A. These graphs are deduced from the results shown in Table 1.

As shown in FIG. 2, when the density of the separator is increased such that the total pore volume per unit mass A (cm³/g) becomes smaller than 1, the air permeability of the battery separator is significantly deteriorated, so that the maximum internal pressure of the battery sharply increases. Furthermore, as shown in FIG. 3, when the density of the separator is decreased such that the porosity becomes 88% or more, i.e., when the total pore volume per unit mass A (cm³/g) becomes 8 or more, the strength of the separator significantly decreases, so that the short-circuit rate is increased.

Thus, in view of the above, preferable results for the battery internal pressure and the short-circuit rate can be obtained by setting the total pore volume per unit mass A (cm³/g) of the separator so as to be within the range of $1 \leq A \leq 5$ as described above.

Example 2

Figure 5:
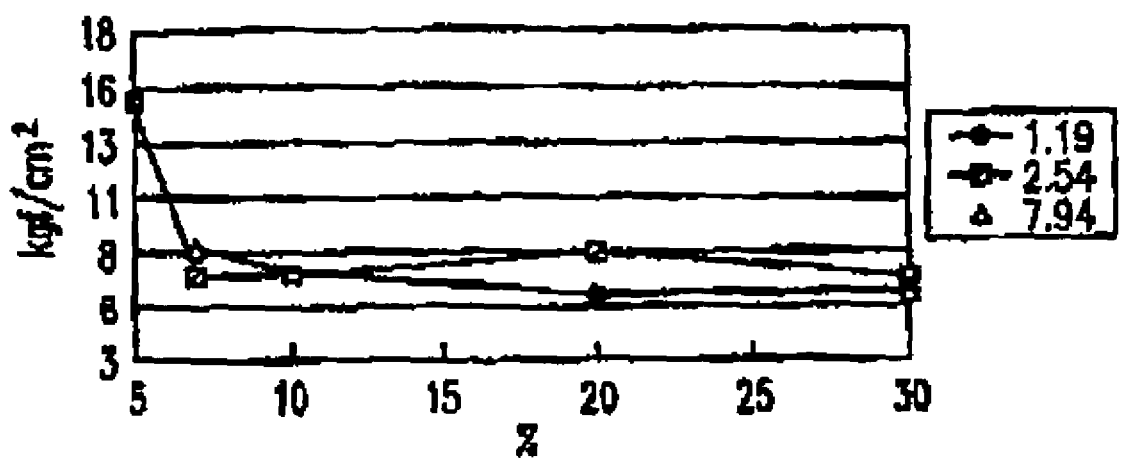
FIG. 5 is a graph illustrating the relationship between the ratio of the volume of pores having a diameter of 100 μm or more to the total pore volume and the battery internal pressure of a battery of Example 2 of the present invention.
Figure 6:
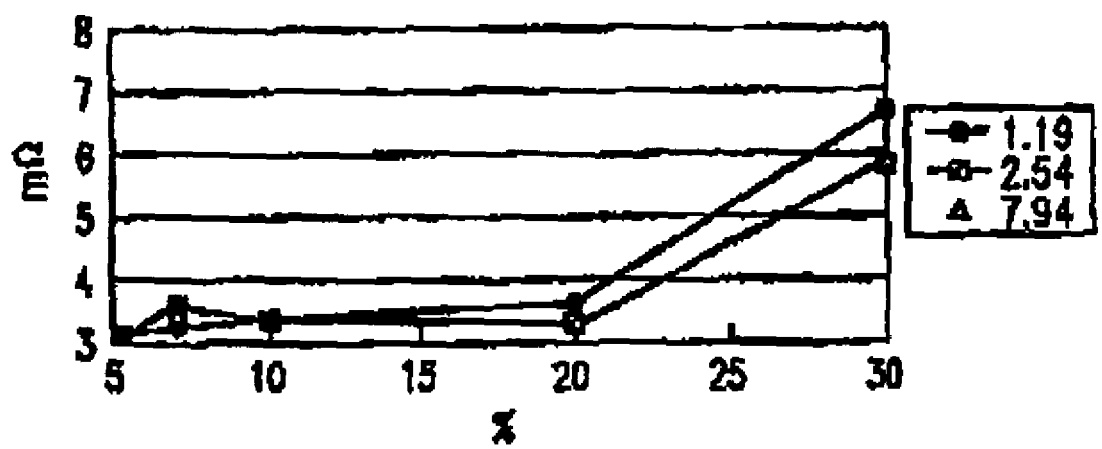
FIG. 6 is a graph illustrating the relationship between the ratio of the volume of pores having a diameter of 100 μm or more to the total pore volume and the internal resistance of a battery of Example 2.

In Example 2, the total pore volume per unit mass A of the separator was 1.19 cm³/g, the thickness of the separator was 180 μm, and the average pore diameter was 20 μm. Separator samples having different pore distributions with the ratio of the volume of pores having a diameter of 100 μm or more to the total pore volume being 5%, 7%, 10%, 20%, and 30% were prepared. Further, for each of two types of separators having the total pore volume per unit mass A of 2.54 cm³/g and 7.94 cm³/g, separator samples having different pore distributions as described above (i.e., the ratio of the volume of pores having a diameter of 100 μm or more to the total pore volume was 5%, 7%, 10%, 20%, and 30%) were prepared. That is, in Example 2, 15 different types of sample separators were prepared in total. These samples were used to produce batteries having the same structure as that of Example 1. For each of the resultant batteries, the maximum internal pressure and the battery internal resistance after 500 cycles (charging-discharging cycles) were evaluated. The results of the maximum internal pressure of the batteries are shown in Table 2 and FIG. 5. The results of the battery internal resistance are shown in Table 3 and FIG. 6.

TABLE 2

Average pore diameter = 20 μm
Maximum internal pressure (kgf/cm²)

| | | Ratio of the volume of pores having a diameter of 100 μm or more | | | | |
|---|---|---|---|---|---|---|
| | | 5% | 7% | 10% | 20% | 30% |
| Total pore volume (cm³/g) | 1.19 | 15 | 8 | 7 | 6 | 6 |
| | 2.54 | 15 | 7 | 7 | 8 | 7 |
| | 7.94 | 15 | 8 | 6 | 7 | 6 |

TABLE 3

Lifetime (internal resistance (mΩ) after 500 cycles)

| | | Ratio of the volume of pores having a diameter of 100 μm or more | | | | |
|---|---|---|---|---|---|---|
| | | 5% | 7% | 10% | 20% | 30% |
| Total pore volume (cm³/g) | 1.19 | 3.1 | 3.3 | 3.4 | 3.6 | 6.7 |
| | 2.54 | 3.2 | 3.5 | 3.4 | 3.3 | 5.8 |
| | 7.94 | 3.4 | 3.4 | 3.6 | 3.8 | 5.9 |

In the case where the ratio of the volume of pores having a diameter of 100 μm or more is smaller than about 7%, the internal pressure of the battery is large. This is because, when the ratio of large pores was decreased, the distribution of the electrolyte in the separator became uniform, but the air permeability of the separator was significantly deteriorated.

When the ratio of the volume of pores having a diameter of 100 μm or more was larger than about 20%, the internal resistance of the battery, which represents the lifetime of the battery, was significantly increased. This is because, when the ratio of large pores was excessively increased, the liquid retaining ability of the separator was decreased, and the solution moved to the electrode plates, and as a result, the internal pressure of the battery was decreased due to a lack of electrolyte in the separator.

Thus, in view of the above, preferable results for the liquid retaining ability and air permeability of the separator can be obtained by setting the ratio of the volume B of pores having a diameter of 100 μm or more to the total pore volume per unit mass A to be in the range of $7\% \leq B/A \leq 20\%$ (i.e., B/A is between 0.07 and 0.2) as described above.

Example 3

In Example 3, for all samples, the total pore volume per unit mass A of the separator was 2.54 cm³/g, the thickness of the separator was 180 μm, the ratio of the volume of pores having a diameter of 100 µm or more to the total pore volume was 10%. According to these specifications, 5 separator samples having different average pore diameters of 5 µm, 10 µm, 20 µm, 30 µm, and 40 µm were prepared. These samples were used to produce batteries having the same structure as that of Example 1. For each of the resultant batteries, the battery internal resistance and the maximum internal pressure of the battery after 500 cycles were evaluated. The results of the battery internal resistance are shown in Table 4 and FIG. 7. The results of the maximum internal pressure of the batteries are shown in Table 5 and FIG. 8.

TABLE 4

Pore volume 2.54 cm$^3$/g
Ratio of the volume of pores having
a diameter of 100 µm or more = 10%
Lifetime (internal resistance (mΩ) after 500 cycles)

| Average pore diameter | 5 µm | 10 µm | 20 µm | 30 µm | 40 µm |
|---|---|---|---|---|---|
| Internal resistance | 3.3 | 3.6 | 3.4 | 3.6 | 7.1 |

TABLE 5

| Average pore diameter | 5 µm | 10 µm | 20 µm | 30 µm | 40 µm |
|---|---|---|---|---|---|
| Max internal pressure (kgf/cm$^2$) | 15 | 6 | 6 | 5 | 6 |

Figure 7:
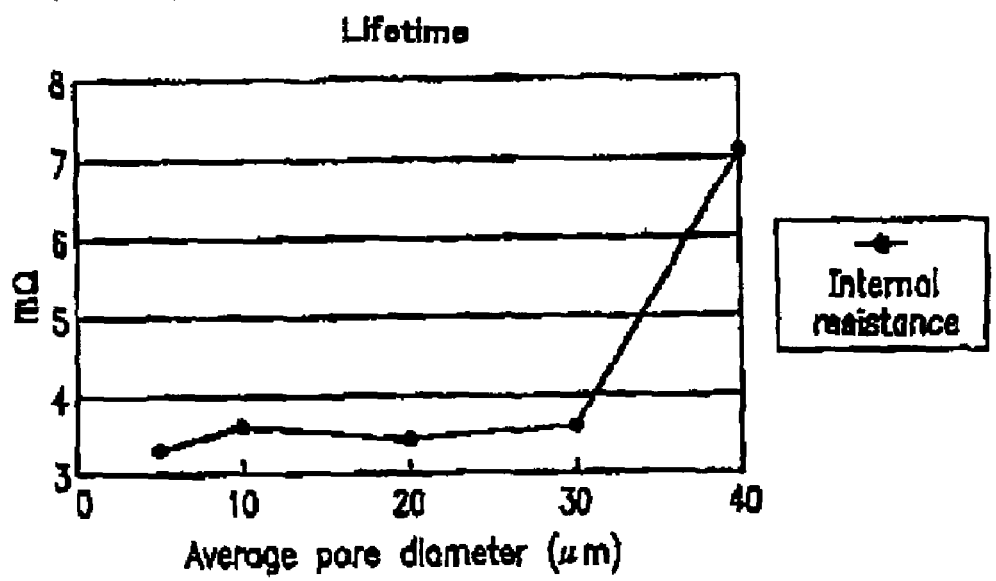
FIG. 7 is a graph illustrating the relationship between the average pore diameter and the internal resistance of a battery of Example 3 of the present invention.
Figure 8:
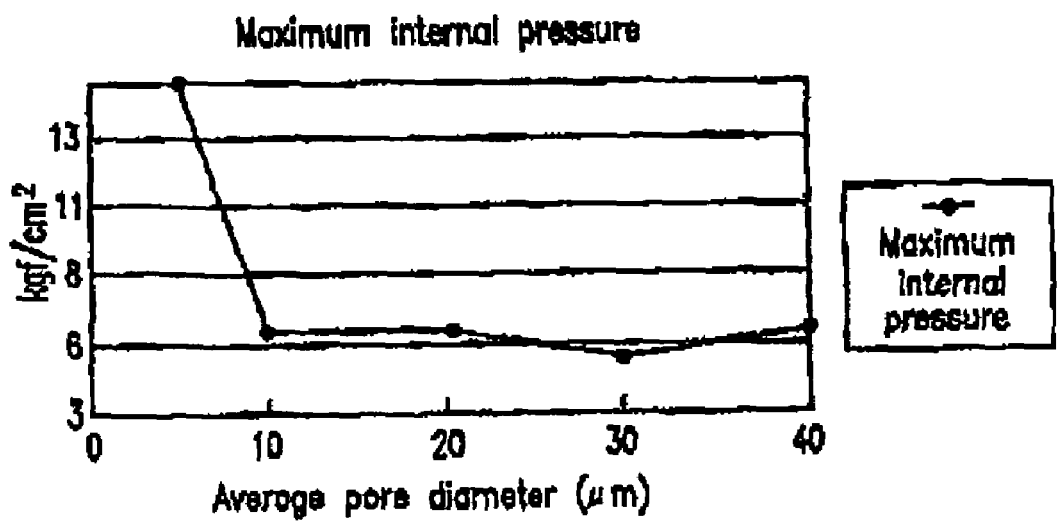
FIG. 8 is a graph illustrating the relationship between the average pore diameter and the maximum internal pressure of a battery of Example 3.

As seen from Table 4 and FIG. 7, when the average pore diameter was greater than 30 µm, the battery internal resistance was significantly high, and the lifetime of the battery became short. This is because, when the ratio of large pores was increased, the liquid retaining ability of the separator was decreased, and the solution moved to the electrode plates, and as a result, the internal pressure of the battery was decreased due to a lack of electrolyte in the separator.

When the average pore diameter is smaller than 10 µm, the maximum internal pressure of the battery becomes significantly high. This is because, in such a case, there are a large number of pores having very small diameters, and the electrolyte is uniformly distributed in the separator.

Thus, in view of the above, preferable results for the liquid retaining ability can be obtained by setting the average pore diameter C (µm) of the separator in the range of $10 \leq C \leq 30$.

In the above examples, the diameter of the fiber used in the separator is substantially constant (about 12 µm). However, the above-described effects of the present invention can be obtained even when another fiber having a different diameter is mixedly contained in the separator.

As described hereinabove, in an alkaline storage battery of the present invention, a separator having both high liquid retaining ability and high air permeability is used. As a result, a sufficient amount of electrolyte is retained by the separator, and an increase of the internal pressure of the battery can be suppressed. Such a battery can stably operate for a long time period.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An alkaline storage battery, comprising:
   a positive electrode plate;
   a negative electrode plate;
   a separator; and
   an alkaline electrolyte retained by the positive electrode plate, the negative electrode plate, and the separator,
   wherein the separator has a large number of pores, such that a total volume A of the pores (per unit mass; cm$^3$/g) is in the range of $1 \leq A \leq 5$, and the ratio of a volume B of pores having a diameter of 100 µm or more (per unit mass; cm$^3$/g) to the total pore volume A is in the range of $7\% \leq B/A \leq 20\%$.

2. An alkaline storage battery according to claim 1, wherein the average pore diameter C (µm) of the separator is in the range of $10 \leq C \leq 30$.

3. An alkaline storage battery according to claim 1, wherein the separator is made of a hydrophilized polyolefin resin.

4. An alkaline storage battery according to claim 1, wherein the ratio of the amount D of electrolyte retained by the separator (per unit mass; cm$^3$/g) to the total pore volume A of the separator satisfies the relationship of $0.8 \leq D/A < 1$.

* * * * *